United States Patent
Dupuis et al.

(10) Patent No.: US 9,887,769 B2
(45) Date of Patent: Feb. 6, 2018

(54) LIFE-CYCLE MANAGEMENT OF FAULTS OCCURING ON OPTICAL FIBRES

(71) Applicant: Alcatel Lucent, Boulogne-Billancourt (FR)

(72) Inventors: Nicolas Dupuis, Chaudfontaine (BE); Stijn Meersman, Waasmunster (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/034,638

(22) PCT Filed: Nov. 27, 2014

(86) PCT No.: PCT/EP2014/075749
§ 371 (c)(1),
(2) Date: May 5, 2016

(87) PCT Pub. No.: WO2015/082291
PCT Pub. Date: Jun. 11, 2015

(65) Prior Publication Data
US 2017/0033862 A1 Feb. 2, 2017

(30) Foreign Application Priority Data
Dec. 3, 2013 (EP) .................................... 13290296

(51) Int. Cl.
*H04B 10/00* (2013.01)
*H04B 10/03* (2013.01)
(Continued)

(52) U.S. Cl.
CPC ......... *H04B 10/03* (2013.01); *H04B 10/0791* (2013.01); *H04B 10/07955* (2013.01); *H04Q 11/0067* (2013.01); *H04Q 2011/0083* (2013.01)

(58) Field of Classification Search
CPC ................ H04B 10/03; H04B 10/0791; H04B 10/07955; H04Q 11/0067; H04Q 2011/0083
(Continued)

(56) References Cited

U.S. PATENT DOCUMENTS 5,592,577 A * 1/1997 Tanoue ............... G01M 11/3109
356/73.1
6,285,475 B1 * 9/2001 Fee ......................... H04B 10/03
398/10
(Continued)

FOREIGN PATENT DOCUMENTS

| CN | 101013919 A | 8/2007 |
|---|---|---|
| CN | 102055523 A | 5/2011 |

(Continued)

OTHER PUBLICATIONS

International Search Report PCT/ISA/210 for International Application No. PCT/EP2014/075749 dated Feb. 5, 2015.
(Continued)

*Primary Examiner* — Juan A Torres
(74) *Attorney, Agent, or Firm* — Harness, Dickey & Pierce, P.L.C.

(57) ABSTRACT

The device includes a first detector configured to detect, from received signal power, first fault parameters related to an occurrence of a first fault on this optical fiber. The device further includes a database configured to store the first fault parameters and a second detector configured to detect from the received signal power second fault parameters related to a restoration of a second fault on the optical fiber. The device further includes a comparator configured to compare the second fault parameters with the stored fault parameters and to decide that the fault is resolved if the first fault parameters most closely match the second fault parameters.

9 Claims, 5 Drawing Sheets

(51) Int. Cl.
*H04B 10/079* (2013.01)
*H04Q 11/00* (2006.01)

(58) Field of Classification Search
USPC .............................................................. 398/1
See application file for complete search history.

(56) References Cited

U.S. PATENT DOCUMENTS

| | | | | |
|---|---|---|---|---|
| 7,542,673 | B2* | 6/2009 | Chung | H04B 10/0771 398/13 |
| 8,682,157 | B2* | 3/2014 | Izumi | H04B 10/032 398/1 |
| 8,792,091 | B2* | 7/2014 | McClean | G01M 11/3145 356/73.1 |
| 9,143,236 | B1* | 9/2015 | Bartur | H04B 10/504 |
| 2004/0037556 | A1* | 2/2004 | Matz | H04B 10/032 398/40 |
| 2005/0190359 | A1* | 9/2005 | Bacque | H04B 10/07955 356/73.1 |
| 2006/0216038 | A1* | 9/2006 | Yokota | H04B 10/0791 398/177 |
| 2010/0284689 | A1 | 11/2010 | Yuki et al. | |
| 2011/0280568 | A1* | 11/2011 | Dvir | H04B 10/0771 398/13 |
| 2012/0002959 | A1* | 1/2012 | Melamed | H04B 10/0771 398/10 |
| 2012/0155857 | A1* | 6/2012 | Wang | H04B 10/0771 398/16 |
| 2013/0177308 | A1 | 7/2013 | Rope et al. | |

FOREIGN PATENT DOCUMENTS

| | | |
|---|---|---|
| CN | 102739306 A | 10/2012 |
| EP | 1126635 A1 | 8/2001 |
| EP | 2579480 A1 | 4/2013 |
| JP | H1079704 A | 3/1998 |
| JP | 2002296110 A | 10/2002 |
| JP | 201270318 A | 4/2012 |

OTHER PUBLICATIONS

Written Opinion of the International Searching Authority PCT/ISA/237 for International Application No. PCT/EP2014/075749 dated Feb. 5, 2015.

* cited by examiner

LIFE-CYCLE MANAGEMENT OF FAULTS OCCURING ON OPTICAL FIBRES

CROSS-REFERENCE TO RELATED APPLICATIONS

This is a National Phase of PCT Patent Application No. PCT/EP2014/075749 filed on Nov. 27, 2014, and claims priority to, European Application No. 13290296.6, filed Dec. 3, 2013, the contents of each of which are hereby incorporated by reference in their entirety.

FIELD OF THE INVENTION

The invention relates to the field of optical networks. More specifically it relates to the monitoring, detection and life-cycle management of faults occurring on optical fibres in a Passive Optical Network or PON.

BACKGROUND OF THE INVENTION

Passive Optical Networks or PONs are more and more replacing traditional physical layer solutions such as twisted pairs or telephone lines and coaxial cable. Optical fibres offer superior bandwidth performance compared with these traditional solutions. The phased integration of PONs has started from the network provider up to the end user premises whereby optical fibre is used to connect the network provider's backbone to distribution points. From these distribution points onwards, traditional wired lines are then used to bridge the last mile towards the end user node. A typical example of such a distribution point is a Digital Subscriber Line Access Multiplexer or DSLAM connecting multiple Digital Subscriber Lines or DSLs to the network provider's backbone by a PON. In densely populated areas or where there are customers requiring high bandwidths, network operators are now even offering PONs up to the end user's premises.

Optical fibres are however prone to physical defects such as bends, a misalignment of contacts and loose, dirty or damaged connectors. Therefore, to ensure good Quality of Service or QoS, it is important to monitor the performance of the optical fibre allowing timely intervention of a technician.

One way of assessing impairments in a PON is by Optical Time Domain Reflectometry or OTDR which is a technique that allows identifying potential defects. However, to provide accurate results, it requires quite long monitoring periods resulting in a long downtime for the end user.

To alleviate the long monitoring periods and downtime periods, embedded OTDR or eOTDR was introduced. With eOTDR, the service does not need to be interrupted and is therefore referred to as a non-intrusive diagnosis technique. Moreover, non-intrusive techniques allow detecting transient phenomena, such as sudden degradation of the fibre, occurring during operation and thus not detectable through a separate monitoring cycle.

However, as both OTDR and eOTDR make use of the reflection characteristics of light, they have the inherent disadvantage that it is difficult to assess the location of the fault. For example, if a fault occurs behind a splitter in the PON, it is difficult to assess in which fibre after the splitter the fault is located.

Therefore, in order to face this issue, other ways of performing diagnosis have been explored. One group of solutions performs monitoring and diagnosis by data analysis of PON operational parameters typically provided by the Physical Layer or PHY in the transceivers connected at the ends of the optical fibre. As the PHY operational parameters are exchanged during operation, these diagnosis techniques are also non-intrusive. The main advantage of using PON operational parameters over eOTDR and OTDR is these operational parameters are available per transceiver and thus per optical link contained in the entire PON network. Therefore, this technique allows a more precise localization of the fault.

Figure 1:
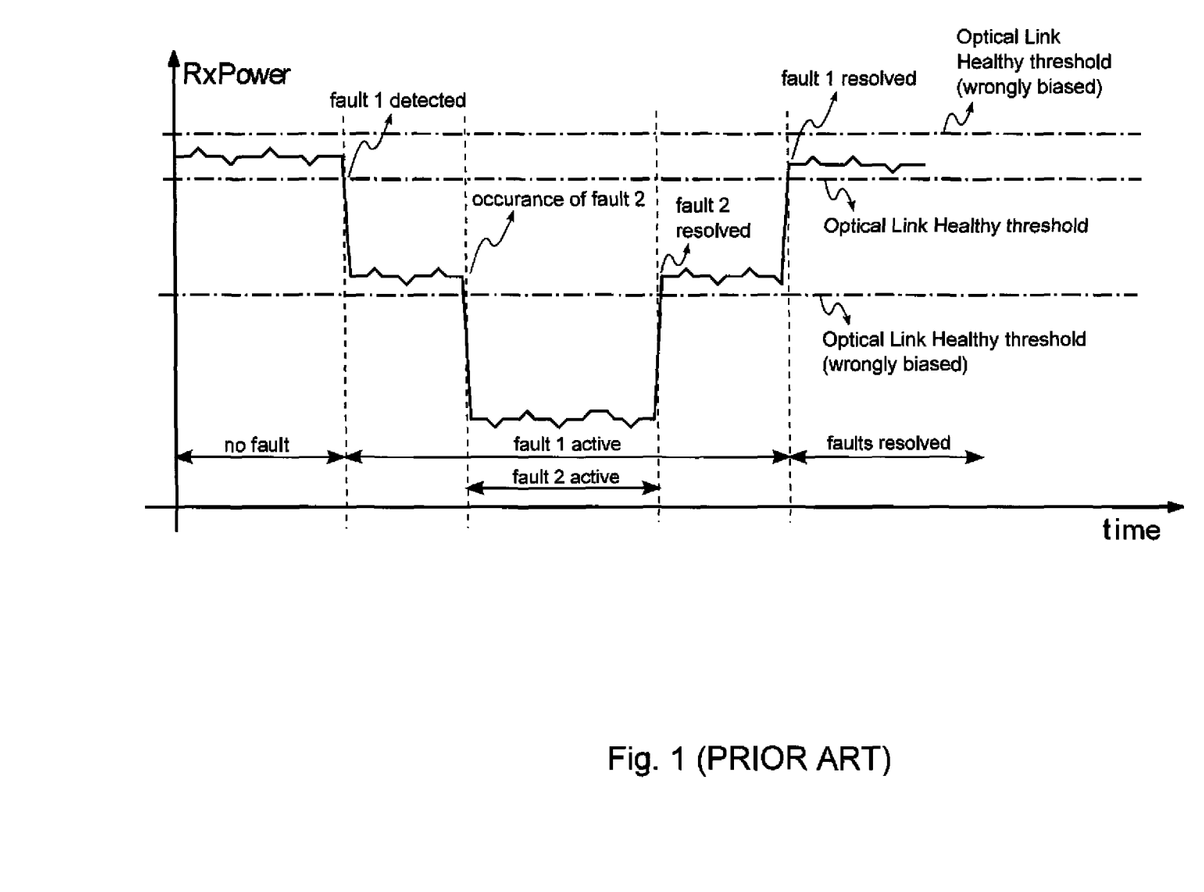
FIG. 1 illustrates received signal power on an optical fibre as a function of time and the application of optical link healthy thresholds for the detection of faults according to the prior art.

One such a solution is illustrated in FIG. 1 and is based on the optical received power or RxPower over time as denoted in the figure, preferably measured at both sides of the optical fibre. There, the appearance of a fault on the fibre is detected by a significant transient step in the RxPower, as for example the case for fault 1. Then, a fault is considered as resolved when the RxPower for the current optical link is restored above a predefined power threshold value, i.e. the Optical Link Healthy threshold. This solution thus allows assessing the global health status of the optical fibre. FIG. 1 shows three such thresholds by the horizontal dashed lines of which only the middle one is correctly chosen.

A disadvantage of the above solution as illustrated by FIG. 1 appears when there is a bias between the optical link healthy threshold and the fault effect. This could cause the RxPower to drop below the optical link healthy threshold even in a healthy state, i.e. when there are no faults at all on the fibre. Also the opposite can happen where the RxPower is above the optical link healthy threshold even when there is a fault occurring on the optical fibre. These two cases are illustrated by the upper and lower optical link healthy threshold in FIG. 1.

Another disadvantage of this solution is that it is not able to discriminate the faults and therefore does not propose an evaluation of the respective life-cycle of the faults. Instead, the global optical link health is evaluated without dedicated information about each fault states. Therefore, it does not allow detecting reparation of a particular fault, it does not allow proposing improvement steps to the field technician during his troubleshooting process nor guiding him and at the end thereby making him blind to any improvements up to the time where the global optical link health is restored.

Finally, the current existing solution cannot make the distinction between the different nature of faults and thus the type of faults occurring such as for example if a fibre is bent or by a dirty connector. Therefore information needed for or about the recovery of a fault is missing, leading at the end the field technician into mistakes.

In the publication of the patent application EP2579480A1, a method is disclosed to derive a type of fault occurring in an optical network by collecting measurement data based on the received signal. However, it does not disclose how to obtain the life-cycle of the fault nor how to differentiate between faults of the same type.

It is therefore an object of the invention to solve or alleviate the above disadvantages and to provide a way to track the life-cycle of individual faults on an optical fibre.

SUMMARY OF THE INVENTION

This object is achieved, in a first aspect by a method for keeping track of life-cycles of faults occurring in an optical fibre. This method comprises the following steps:

Detecting first fault parameters from received signal power related to an occurrence of a first fault on this optical fibre. These first fault parameters comprise a degradation in the received signal power, a tolerance on the degradation and a type of the first fault.

Storing these first fault parameters.

Detecting second fault parameters from the received signal power related to a restoration of a second fault on the optical fibre. These second fault parameters comprise an increase in the received signal power, a tolerance on the increase and a type of the second fault.

Comparing the second fault parameters with stored fault parameters including the first fault parameters. Then it is decided that the first fault is resolved if the first fault parameters most closely match the second fault parameters by this comparing.

Every fault occurrence or recovery on the optical fibre may thus be stored, for example in a database. This way, the faults that have occurred on the line and that are active, i.e. unresolved, are known at any time. As soon as a fault is resolved, it is marked as resolved. It is therefore an advantage that the full life-cycle of an individual fault can be tracked, i.e. when it appeared and whether it is active or resolved. It can thus be assessed by a technician which type of fault to look for and whether a repairing action has resolved the fault.

The identification of a resolved fault with one of the active faults that are stored is done by comparison of the three parameters. The type of the fault is a first differentiator between the stored faults. A type of fault may for example be a bend in the fibre, a misalignment of a contact or a faulty connector. To further differentiate between faults of the same type, the difference between the received signal power before and after the occurrence or the resolving of the fault is used, i.e. the actual decrease and increase of the received power. To accomplish this, the actual difference may be stored or the start and end value of the received power. As the received power signal may be a noisy signal and be prone to drifting, also the tolerance on the detected increase or decrease is stored and used to differentiate between the detected faults. This thus allows to differentiate further between faults of the same type.

The received signal power is a time varying signal. Preferable, it is obtained from both ends of the fibre, i.e. from the transceivers connected to each end of the optical fibre, but may also be obtained from only one of the transceivers. Typically, such a transceivers allow retrieving the received signal power at certain time intervals. Due to the time varying character of the received signal power, the detecting of the fault parameters is a continuous process or tracking process. The actual increase and decrease may then be obtained from averaged or mean values measured over a certain time interval. Similarly, the calculation of the tolerance may be based on the tracking of the received signal power over a certain time interval.

According to an embodiment, the received signal power comprises different frequency components. The method then further comprises aggregating the different frequency components into a total received signal power. The increase, the degradation and the tolerance on the degradation and the increase are then detected from this total received signal power. The type of the first fault and the type of the second fault is then detected from these different frequency components. In order to detect the degradation, increase and tolerances, the aggregating will group the different frequency components into the single time varying total received signal power. This may for example be done by simply averaging every power sample over the frequency bands for a certain time thereby obtaining a single received signal power at a certain time. Another possibility may be to take a worst-case approach where only the largest drop or increase is used.

The received signal power is thus specified separately over frequency bands according to the spectrum used in the optical fibre. Thereby, the type of the fault is derived from the degradation in received signal power in each of the frequency bands.

As in an optical fibre, the transceivers will receive the signals already separated over the frequency bands, the signal power will be readily available for each frequency band. It is thus an advantage that the type of the fault can be obtained from data that is readily and easily available in optical fibre networks.

The different frequency components may further be received as Received Signal Strength Indication or RSSI parameters from a transceiver connected to the optical fibre.

The RSSI parameter is widely used in PHY layers and can be retrieved in a straightforward manner from transceiver chipsets. RSSI parameters are also communicated between transceivers. Therefore, it is an advantage that received signal power can be received from transceivers at both ends of the optical fibre while only communicating with one of them. The use of RSSI parameters thus allows an easy integration of the above method in existing PONs without changes needed to the actual transceivers.

According to an embodiment the storing comprises marking the first fault as active. The method then further comprises marking the first fault as resolved if the first fault parameters most closely match the second fault parameters by the comparing.

By this marking the life-cycle of the faults can be easily tracked and also the faults that were resolved can also be tracked.

According to an embodiment the first fault parameters most closely match if:
the type of the second fault equals the type of the first fault; and if
the increase plus or minus the tolerance on the increase most closely match to the decrease plus or minus the tolerance on the decrease.

As the received signal power is not an exact value but has a statistical component expressed by the tolerance, this embodiment allows to easily obtain the closest matching fault, i.e. by simple additions and subtractions.

According to an alternative embodiment, the first fault parameters most closely match if:
the type of the second fault equals the type of the first fault; and if
a first Gaussian process obtained from the degradation and the tolerance on this degradation is statistically closest to a second Gaussian process obtained from the increase and the tolerance on this increase compared with Gaussian processes obtained from the stored fault parameters.

By using statistical comparison expressed by a statistical distance, the variance on the repeatability of the measurements is taken into account allowing to better differentiate faults that cause a similar decrease and increase of the received signal power.

In a second aspect, the invention also relates to a device for keeping track of life-cycles of faults occurring in an optical fibre. The device comprises:
A first detector configured to detect from received signal power first fault parameters related to an occurrence of a first fault on this optical fibre comprising a degradation in the received signal power, a tolerance on the degradation and a type of this first fault.
A database configured to store the first fault parameters.

A second detector configured to detect from the received signal power second fault parameters related to a restoration of a second fault on the optical fibre comprising an increase in the received signal power, a tolerance on this increase and a type of this second fault.

A comparator configured to compare the second fault parameters with stored fault parameters including the first fault parameters and to decide that the first fault is resolved if the first fault parameters most closely match the second fault parameters by this comparing.

In a third aspect, the invention relates to a digital data storage medium encoding a machine-executable program of instructions to perform the method according to the first aspect.

In a final aspect, the invention relates to a processor configured to perform the method according to the first aspect.

DETAILED DESCRIPTION OF EMBODIMENT(S)

Figure 2:
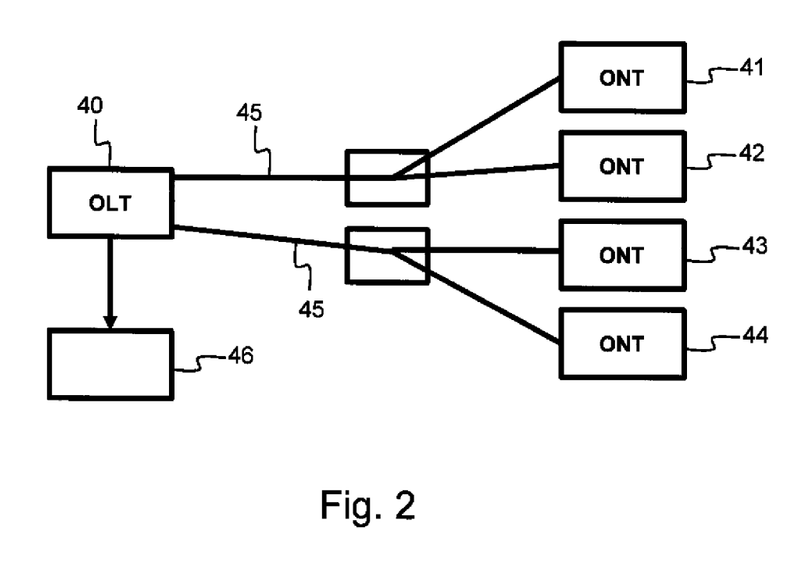
FIG. 2 illustrates a Passive Optical Fibre network or PON and a device for life-cycle management of faults on optical fibres in this PON according to an embodiment of the invention.

FIG. 2 illustrates a Passive Optical Network or PON connecting an optical line terminal or OLT 40 at the service provider's central office and a number of optical network terminals or ONTs 41 till 44 near end users by optical fibres 45. Due to faults in the optical fibres 45, degradation of the signals travelling of the PON may occur causing a decrease in bandwidth or thus total throughput of the PON. For the detection and tracking of these faults, a fault tracking device 46 according to an embodiment of the invention is connected to the OLT 40.

Figure 3:
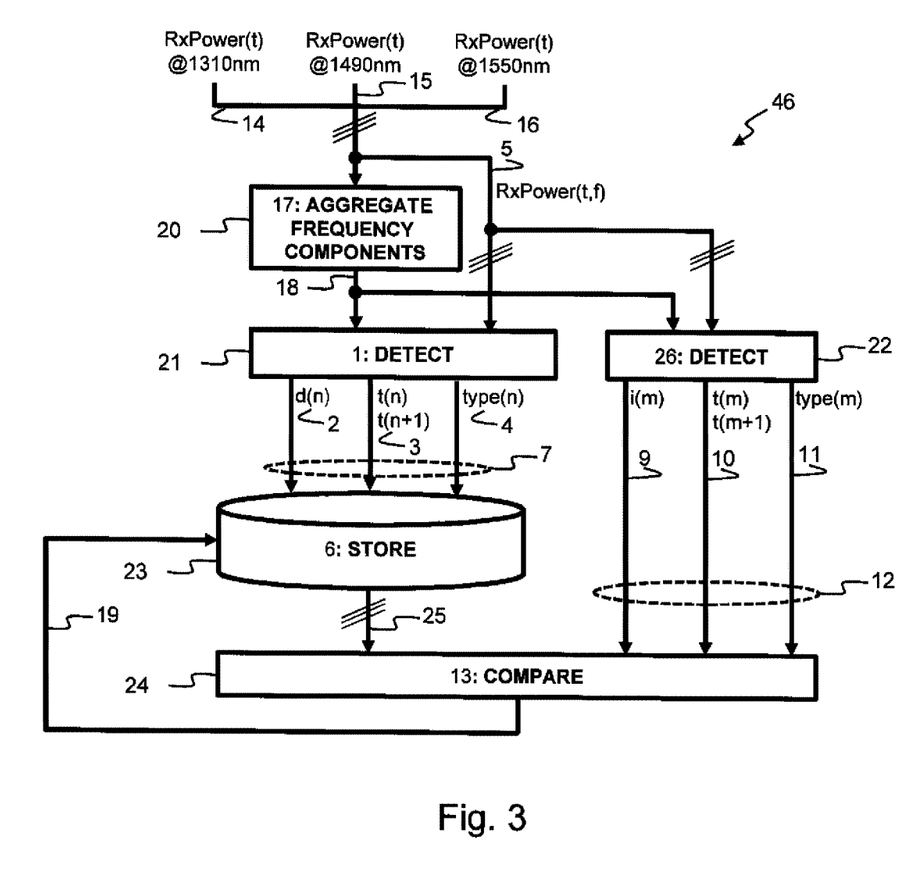
FIG. 3 illustrates a fault detection device for detection and life-cycle management of faults in optical fibres.

FIG. 3 shows further details of the fault tracking device 46 according to an embodiment of the invention. As input, the device 46 receives different frequency components 14, 15 and 16 of received signal power at the transceivers of the PON. This signal power may be received by the OLT 40 or any of the ONTs 41-44. As an example, in FIG. 3, three frequency bands are monitored, i.e. received power of signals at frequencies with wavelengths of 1310 nm, 1490 nm and 1550 nm. During certain periods, the transceivers 40-44 measure the received power at these frequencies and provide it to the device 46 as received power samples or RxPower samples. One sample may for example be an average over a one hour period. This way the fault tracking device 46 receives a received signal power 5 which is both varying with time and frequency, hence the notation RxPower(t,f) in FIG. 3 where t refers to time and f refers to frequency.

In a first aggregator block 20 of the fault tracking device 46, the received signal power for each frequency is combined into a single total received signal power 18. The total received signal power 18 is thus no longer dependent on frequency but only on time. The aggregating may be performed by averaging every the sample at a certain time over the frequency components, but other ways are also possible. For example, also the mean value could be used or just one of the frequency components could be selected as the total received signal frequency 18.

Figure 4:
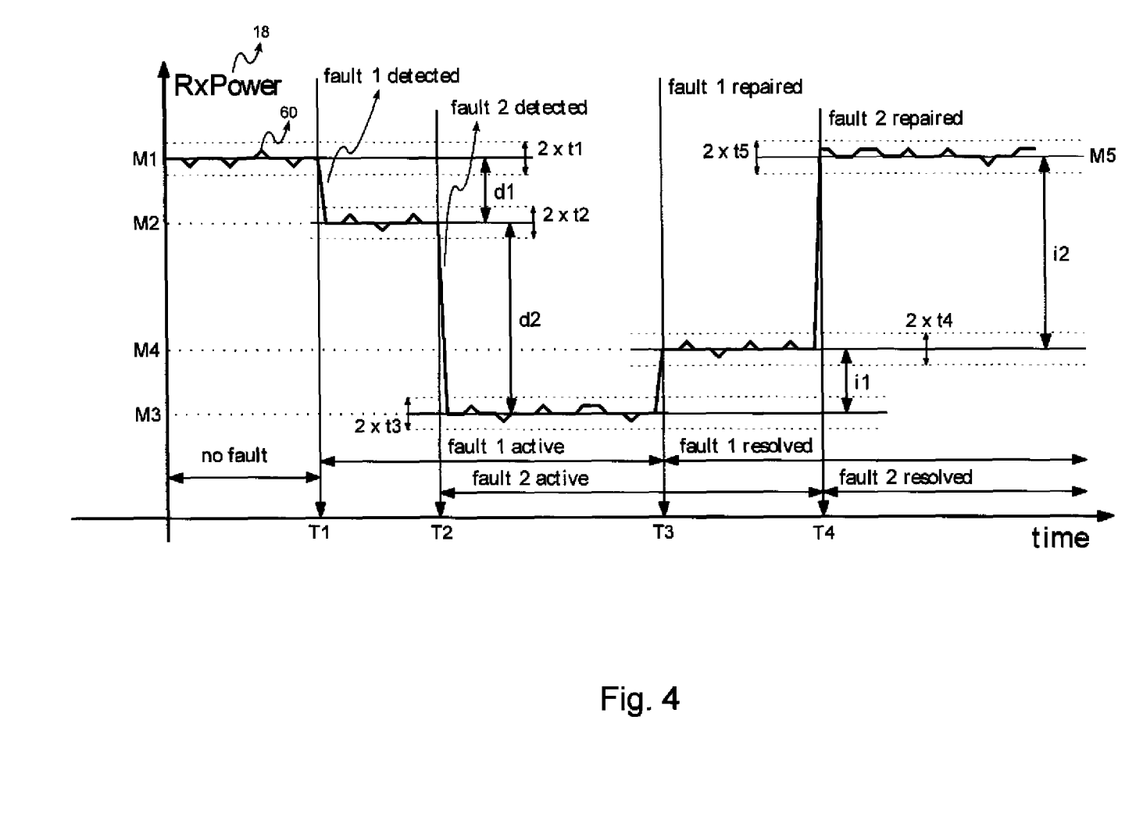
FIG. 4 illustrates received signal power or RxPower from a transceiver connected to an optical fibre as function of time and changes in this received signal power due to the occurrence and restoration of faults occurring on this optical fibre.

An example of the total received signal power 18 is illustrated by FIG. 4 by the curve 60. This figure will further be used to illustrate the steps of the embodiment of FIG. 3.

The received signal power for the different frequency components 14, 15 and 16 are provided to the first detector block 21 together with the total received signal power 18. This block 21 continuously tracks the signal power 18. As the signal 18 can be noisy, the block 21 tracks both an average value and a standard deviation around which the signal 18 fluctuates. For example, in FIG. 4 the signal or RxPower 18 fluctuates around the value M1 with a deviation of t1 during the time interval zero to T1. At a certain time, the detector 21 detects a drop or degradation in the RxPower which is greater than the normal deviation around the tracked averaged value. This indicates that a fault has occurred on the monitored optical fibre. In order to provide a measure of the fault, the detector 21 will provide a new average value and a new deviation around this new average value after the degradation has occurred. In order to quantify the fault that has occurred, the detector 21 produces the following parameters:

d(n) or the degradation of the received signal 18 caused by the detected fault which is expressed as the difference between the average value of the signal 18 before the fault has occurred and the average value of the signal 18 after the fault has occurred.

t(n) or the deviation around the average value before the fault had occurred.

t(n+1) or the deviation around the new average value after the fault has occurred.

The deviation t(n) and t(n+1) is thus related to the tolerance on the degradation value d(n) itself and thus indicates how far this degradation value may actually differ from the real value.

Referring back to the example of FIG. 4, a first fault occurs in the optical fibre at the moment T1 and will be detected by the detector 21 by the drop in RxPower from the average value M1 to the average value M2. The degradation d(n) is thus the difference d1 between M2 and M1. The tolerance t(n) is here t1 and the tolerance t(n+1) is here t2.

When a fault is detected by the detector 21, it also derives the type 4 of the fault by assessing the degradation of the received power for the different frequencies as provided by the signal 5. This may be done as provided in EP2579480A1 by deriving the cause or the type of the fault as:

$$Bend: Loss_{ds} > Loss_{us}$$

$$Contact\ misalignment: Loss_{ds} < Loss_{us}$$

$$Faulty\ connector: Loss_{ds} = Loss_{us}$$

whereby:

$Loss_{ds}$ is the loss or degradation in the downstream frequency band, and

Loss$_{us}$ is the loss or degradation in the upstream frequency band, and

Bend is a type of fault related to a bend in the optical fibre, and

Contact misalignment is a type of fault related to a misalignment of contacts between sections of the optical fibre, and Faulty connector is a type of fault related to a faulty connector on the optical fibre, for example because it is loose, damaged or dirty.

Thus, when a fault has occurred on the optical fibre, the detector 21 will provide the degradation 2 or d(n), the tolerance 3 on the degradation or t(n) and t(n+1) and the type 4 of the degradation or type(n). All these parameters 7 characterizing the fault are then stored 6 in a database 23 where the fault is indicated as active.

The detecting process 1 is a continuous process and every time a fault is detected it will be stored in the database 23. Referring to the example of FIG. 4, two faults are occurring after each other, one at the time T1 and one at the time T2. Therefore two new entries would be made in the database, one entry for (d1, t1, t2) and the type of this first fault and one entry for (d2, t2, t3) and the type of this second fault.

A second detector block 22 performs a same detecting operation 26 as the first detector block 21 but for detecting the opposite effect, i.e. when a fault gets restored. The way the detecting 26 works is completely identical to that of the first detector 1, whereby instead of a degradation in total received signal power 18, an increase in the total received signal power 18 is detected. The received signal power for the different frequency components 14, 15 and 16 are also provided to this second detector block 22 together with the total received signal power 18. This block 22 continuously tracks the signal power 18. For example, in FIG. 4 the signal or RxPower 18 fluctuates around the value M3 with a deviation of t3 during the time interval T2 to T3. At a certain time T3, the detector 22 detects an increase in the RxPower 18 which is greater than the normal deviation t3 around the tracked averaged value M3. This indicates that a fault has been restored on the monitored optical fibre. In order to provide a measure of the restoration, the detector 22 will provide a new average value M4 and a new deviation t4 around this new average value after the fault was restored. In order to quantify the fault that has occurred, the detector 22 produces the following parameters:

i(m) or the increase of the received signal 18 caused by the detected fault which is expressed as the difference between the average value of the signal 18 before the fault was restored and the average value of the signal 18 after the fault was restored.

t(m) or the deviation around the average value before the fault was restored.

t(m+1) or the deviation around the new average value after the fault was restored.

Similar to the detector 21, the detector 22 will also provide a type of fault that is restored or type(m) 11. Thus, when a fault was restored in the optical fibre, the detector 22 will provide the increase 9 in received signal power or d(n), the tolerance on the increase or t(m) and t(m+1) and the type 11 of the degradation or type(m). All these parameters 12 characterize the restored fault.

When the restoration of a fault is detected it is compared with the stored fault parameters 25 in the database. This is done by comparing the stored degradations with the amount of recovering increase in order to assess, within the tolerance, if there exists a matching fault, i.e., whether a fault from the database 23 can be linked to the detected restored fault. Also, the type of the fault and the nature of the recovering have to match. In other words, the second fault parameters 12 are compared with stored fault parameters 25 and it is decided that a certain stored fault is resolved if it is equal to the second fault parameters 12. Instead of equal, it may also be decided that a stored fault is resolved when it most closely matches the second fault parameters 12 by the comparison.

According to an embodiment of the invention this comparing 13 is done by searching for stored fault parameters 25 such that the following equations are fulfilled:

$$i(m) \pm t(m) \pm t(m+1) = d(n) \pm t(n) \pm t(n \pm 1)$$

and $$type(m) = type(n)$$

When a stored fault has been found that matches these equations, a match is found and the fault is marked in the step 19 as restored by updating the entry in the database 23.

Figure 5:
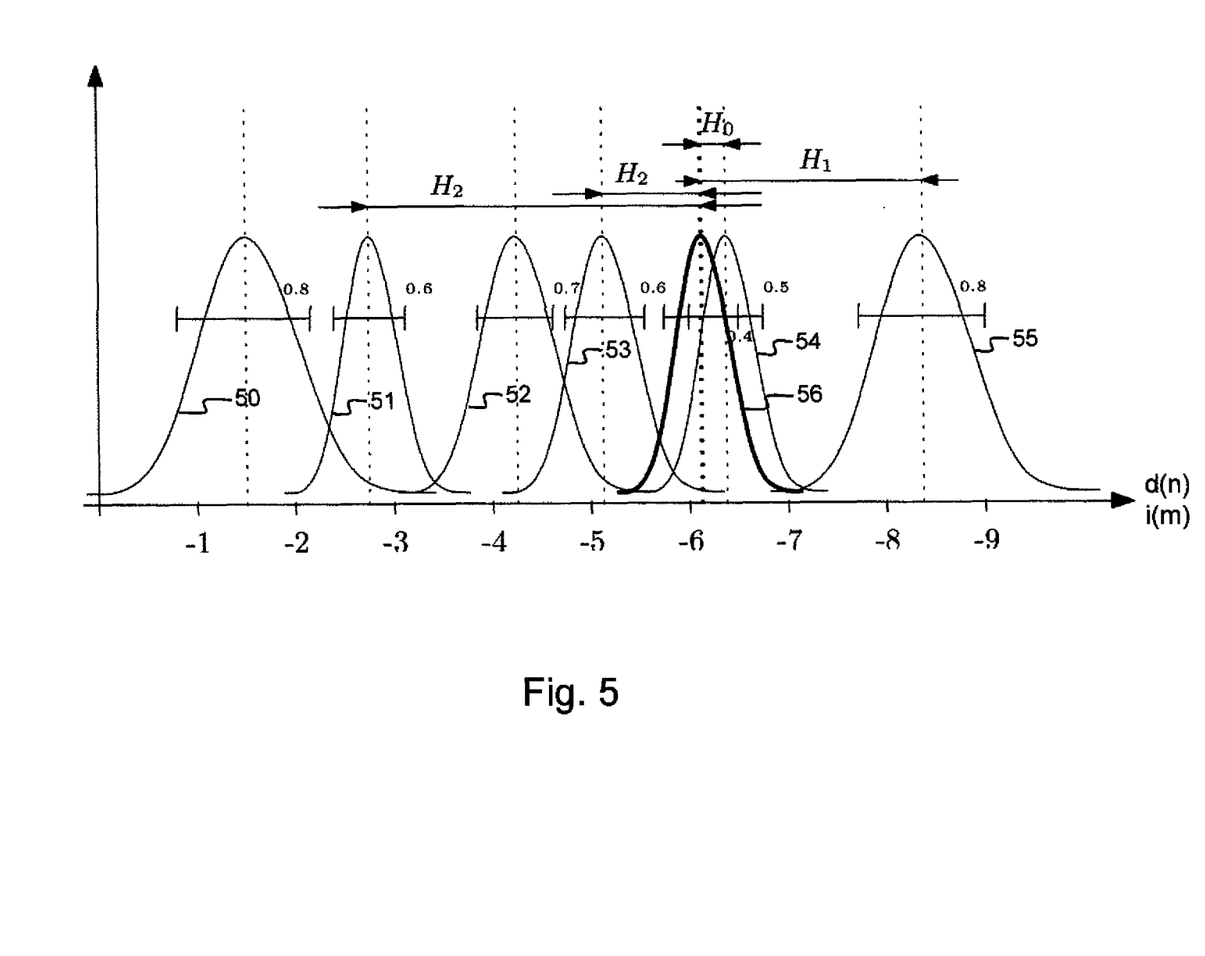
FIG. 5 illustrates Gaussian curves derived from fault data for the identification of fault recoveries according to an embodiment of the invention.

According to an alternative preferred embodiment this comparing 13 is done by statistically assessing the fault parameters. This is illustrated by FIG. 5 and the tables provided hereunder. Amplitude values as well as tolerances are assessed statistically, i.e. Gaussian processed, and, therefore, hypothesis tests are performed. As an example, table 1 below comprises the faults already detected and stored in the database 23.

TABLE 1

| id | type(n) | d(n) | t(n) | t(n + 1) |
|---|---|---|---|---|
| 1 | bend | −4.2 dB | 0.2 dB | 0.5 dB |
| 2 | misalign | −5.1 dB | 0.4 dB | 0.2 dB |
| 3 | dirty | −6.3 dB | 0.2 dB | 0.3 dB |
| 4 | dirty | −8.4 dB | 0.3 dB | 0.5 dB |
| 5 | bend | −1.5 dB | 0.5 dB | 0.3 dB |
| ... | | | | |
| N | bend | −2.8 dB | 0.3 dB | 0.3 dB |

An amount of N faults have been stored in the database 23 each identified by their id, i.e. a unique number, in the first column. The second column shows the type 4 of the fault, the third column shows the degradation 2 or d(n) and the fourth and fifth columns show the deviation around the value of the received power 18 before and after the occurrence of fault respectively, i.e. t(n) and t(n+1).

A detected recovery is then presented in a similar fashion in the Table 2 below.

TABLE 2

| type(m) | i(m) | t(m) | t(m + 1) |
|---|---|---|---|
| dirty | +6.1 dB | 0.3 dB | 0.1 dB |

In order to retrieve the closest match between the detected fault recovery from Table 2 and the stored detected faults from Table 1, the data from the two tables is assessed statistically. FIG. 5 shows a representation of this data as Gaussian curves 50 till 56 whereby each row of the tables 1 and 2 is represented as a Gaussian curve with d(n) or i(m) as the centre of the curve on the x-axis and the sum of the tolerances t(m) and t(m+1) or t(n) and t(n+1) as the variance determining the width of the Gaussian curve. The curves 50 to 55 represent the entries from Table 1 whereas the curve 56 represents the entry from Table 2.

The distance H0 then states, among the degradations of the same type, i.e. a degradation caused by a dirty connector, if there is a matching in terms of power variation amplitude, with an entry from Table 2 and thus with an entry of the database 23. To state about that, a Student-t test is used. It tests therefore the statistical distance or difference between the current Gaussian process, i.e. the current reported recovery represented by the curve 56, and each other Gaussian process of the same type, i.e. the stored degradations of the same type represented by the curves 54 and 55. H0 is then true if there is a statistical matching with the Gaussian process of one entry. If there is no matching, H1 is reported as true. H2 holds (is reported as true) for other types of degradations.

Again, when a fault has been detected and identified by the above preferred embodiment, the database 23 is updated in a step 19 by indicating that the fault has been resolved.

The above device 46 has been described with various components 20 to 24 and the interaction between them to obtain life-cycle management of faults occurring on an optical fibre. These components 20 to 24 are not necessarily physical components, but may also be logical components of a software program. This software program then implements the steps 17, 1, 26, 6 and 13 necessary to fulfil the functionality of the components 20 to 24 and their interaction. This software program may be written in software code and compiled into machine executable code such that it can be executed on a processor comprised in the device 46.

The device 46 may be implemented as part of the OLT 40 or ONT 41. This way it may have easy access to the Physical layer parameters such as the received signal power 14, 15 and 16. The device 46 may also be remotely connected to the optical network whereby the received optical power 14, 15 and 16 is forwarded to the device 46. One possibility is illustrated by FIG. 2 where the device 46 has remote access to the OLT 40. The advantage of this topology is that the device 46 may be further connected to other optical networks hereby centrally monitoring the life-cycle of faults occurring throughout different optical networks.

The received optical power 14, 15 and 16 may further be RSSI or Received Signal Strength Indication parameters as commonly used in physical layers and indicating the strength and thus power of the received signal. As the RSSI parameters may be communicated from the ONT to the OLT and as the fault monitoring device is connected to the OLT, it may thus receive the RSSI parameters from the OLT as well as the ONTs ensuring a better estimate of the received optical power.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device for keeping track of life-cycles of faults occurring in an optical fibre, the device comprising:
    a memory storing computer-readable instructions; and
    a processor configured to execute the computer-readable instructions to,
        detect from received signal power first fault parameters related to an occurrence of a first fault on said optical fibre comprising a degradation in said received signal power, a tolerance on said degradation and a type of said first fault;
        store said first fault parameters in a database;
        detect from said received signal power second fault parameters related to a restoration of a second fault on said optical fibre comprising an increase in said received signal power, a tolerance on said increase and a type of said second fault; and
        compare said second fault parameters with stored fault parameters including said first fault parameters and determine that said first fault is resolved in response to said first fault parameters most closely matching said second fault parameters based on said comparing.

2. A method for keeping track of life-cycles of faults occurring in an optical fibre, the method comprising:
    detecting first fault parameters from received signal power related to an occurrence of a first fault on said optical fibre comprising a degradation in said received signal power, a tolerance on said degradation and a type of said first fault;
    storing said first fault parameters;
    detecting second fault parameters from said received signal power related to a restoration of a second fault on said optical fibre comprising an increase in said received signal power, a tolerance on said increase and a type of said second fault; and
    comparing said second fault parameters with stored fault parameters including said first fault parameters and determining that said first fault is resolved in response to said first fault parameters most closely matching said second fault parameters based on said comparing.

3. The method according to claim 2, wherein said received signal power comprises different frequency components, and said method further comprises:
    aggregating said different frequency components into a total received signal power, wherein
        said increase, said degradation and said tolerance on said degradation and said increase are detected from said total received signal power; and said type of said first fault and said type of said second fault are detected from said different frequency components.

4. The method according to claim 2, wherein said storing comprises marking said first fault as active, said method further comprising:
  marking said first fault as resolved in response to said first fault parameters most closely matching said second fault parameters based on said comparing.

5. The method according to claim 2, wherein said first fault parameters most closely match based on:
  said type of said second fault and said type of said first fault being a same type of fault; and
  said increase plus or minus said tolerance on said increase most closely matching said degradation plus or minus said tolerance on said degradation.

6. The method according to claim 2, wherein said first fault parameters most closely match based on:
  said type of said second fault and said type of said first fault being a same type of fault; and
  a first Gaussian process obtained from said degradation and said tolerance on said degradation being statistically closest to a second Gaussian process obtained from said increase and said tolerance on said increase compared with Gaussian processes obtained from said stored fault parameters.

7. A non-transitory computer-readable storage medium storing instructions, which when executed by a processor configure the processor to perform the method according to claim 2.

8. A processor configured to perform the method according to claim 2.

9. The method according to claim 3, further comprising:
  receiving said different frequency components as Received Signal Strength Indication (RSSI) parameters from a transceiver connected to said optical fibre.

* * * * *